US006716407B2

(12) United States Patent
Davis et al.

(10) Patent No.: US 6,716,407 B2
(45) Date of Patent: Apr. 6, 2004

(54) MONAZITE-BASED COATINGS FOR THERMAL PROTECTION SYSTEMS

(75) Inventors: Janet B. Davis, Thousand Oaks, CA (US); David B. Marshall, Thousand Oaks, CA (US); Peter Ernest David Morgan, Thousand Oaks, CA (US); Kris Shigeko Oka, West Covina, CA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 09/883,760

(22) Filed: Jun. 18, 2001

(65) Prior Publication Data

US 2002/0189496 A1 Dec. 19, 2002

(51) Int. Cl.$^7$ .................................. C01F 17/00
(52) U.S. Cl. ................. 423/305; 106/286.1; 106/286.2; 106/286.5; 106/286.6; 106/286.8; 106/287.17; 106/287.18; 106/287.19; 423/306; 501/126
(58) Field of Search ............... 106/287.18, 287.19, 106/286.1, 286.2, 286.5, 286.6, 286.8, 287.17; 423/305, 306; 501/126

(56) References Cited

U.S. PATENT DOCUMENTS

| 4,942,697 A | * | 7/1990 | Khaladji et al. ............... 51/309 |
| 4,961,786 A | | 10/1990 | Novinson |
| 5,137,852 A | | 8/1992 | Morgan et al. |
| 5,415,851 A | * | 5/1995 | Kimura et al. ............... 423/263 |
| 5,470,503 A | * | 11/1995 | Braconnier ........... 252/301.4 P |
| 5,514,474 A | | 5/1996 | Morgan et al. |
| 5,567,403 A | * | 10/1996 | Kimura et al. ............... 423/263 |
| 5,567,518 A | | 10/1996 | Pejryd et al. |
| 5,665,463 A | | 9/1997 | Morgan et al. |
| 5,759,632 A | | 6/1998 | Boakye et al. |
| 5,951,958 A | * | 9/1999 | Kimura ..................... 423/263 |
| 5,958,583 A | | 9/1999 | Rorabaugh et al. |
| 6,023,006 A | * | 2/2000 | Fiquet et al. .................. 588/2 |

* cited by examiner

*Primary Examiner*—Anthony J. Green
(74) *Attorney, Agent, or Firm*—Harness Dickey & Pierce P.L.C.

(57) ABSTRACT

Monazite or xenotime-based blanket coatings that stiffen ceramic fabrics without causing embrittlement at temperatures of at least as high as 2400° F. are provided. Methods for making the coatings are also provided. The methods comprise the synthesis of high purity, monazite and xenotime powders with the stoichiometric ratio of metal to phosphorous of about 1:1.

18 Claims, No Drawings

MONAZITE-BASED COATINGS FOR THERMAL PROTECTION SYSTEMS

FIELD OF THE INVENTION

The present invention relates to ceramic composites and, in particular, to high temperature ceramic composites containing monazites or xenotimes as a component.

BACKGROUND OF THE INVENTION

State of the art thermal protection (i.e., heat shields) for space re-entry vehicles such as the space shuttle consists of rigid ceramic tiles attached to the vehicle surface. Each tile is relatively small in area to avoid detachment driven by thermal and mechanical loads. They are costly to fabricate and to bond to the surface. Upon re-entry, tiles are often damaged, which results in a labor intensive, time consuming replacement operation. With the goals of low cost and quick turnaround for reuse of spacecraft, rigid tiles are not desirable.

Flexible insulating blankets made from ceramic fibers show promise for allowing larger component sizes, easier attachment, and damage tolerance. However, they are now used only in areas of the vehicle surface that experience relatively low temperatures because traditional blankets made entirely from silica quickly deteriorate upon exposure to high temperatures. Blankets used presently consist of a relatively thick layer of flexible insulating batting produced from random discontinuous fibers, sandwiched between two layers of thin woven fabric produced from continuous fibers. A silica coating is usually applied to the outer surface to improve the resistance of the surface to damage. The coating infiltrates into the woven fabric face sheet and stiffens it, similar to the effect of starch in textile fabrics. The blankets are initially flexible and are relatively easy to apply to the vehicle surface. However, they rapidly become brittle if exposed to temperatures that are sufficiently high to allow the touching fibers to fuse strongly together or to allow the coating to bond strongly to the fibers. Embrittlement makes the blankets susceptible to damage and forces their replacement. These silica blankets have a reuse temperature of only about 1200° F.

Blankets constructed from more refractory fibers (based on alumina or mullite) have also been tried, but they have achieved limited success because the silica coating bonds to the fibers at high temperature causing embrittlement.

To allow significantly expanded replacement of tiles with blankets, coated blankets must be able to withstand reentry temperatures of at least 1800–2300° F., while remaining tough and flexible. Therefore, a coating solution for the blanket fibers must retain the flexibility of the fabric while avoiding embrittlement upon exposures to temperatures in this range.

To avoid embrittlement, the coating material must not sinter and bond strongly to the ceramic fibers or react with the fibers at these temperatures. Moreover, the coating material must be stable in oxidizing environments. Rare-earth phosphates (monazite and xenotime) were shown to satisfy these requirements as disclosed in U.S. Pat. Nos. 5,514,474 and 5,958,583, hereby incorporated by reference. The use of these compounds to form oxide composites with weakly bonded fiber-matrix interfaces is described. A method for infiltrating the matrix into a fiber preform using a slurry consisting of alumina powder and solution precursors for the rare-earth phosphate (La-monazite) is also described. This method provides a matrix that is converted during heat treatment to a mixture of the rare-earth phosphate and alumina. The solution precursor does not degrade the properties of composites containing high purity alumina fibers (example, NEXTEL® 610, manufactured by 3M Company) during this precursor conversion step and subsequent heat treatment to at least 2200° F. However, the properties of composites containing other, less refractory, ceramic fibers that are desirable for use in thermal protection systems (example, NEXTEL® 440, 3M Company) were degraded at temperatures of 2000° F. Davis, J. B. et al, *Composites: Part A* 30, 483–488 (1999).

SUMMARY OF THE INVENTION

The present invention provides monazite- or xenotime-based coatings that can stiffen ceramic fabrics without causing embrittlement at temperatures of at least as high as 2300° F. In one embodiment the coatings comprise high purity monazite powders. The high purity monazite powders provide a superior coating for use at temperatures above 1800° F. In another embodiment, the coatings further include additives, such as SiC, to increase emissivity.

The present invention also provides methods for the synthesis of high purity, stoichiometric monazite powders for use in blanket coatings. In one embodiment the methods comprise forming crystalline particles of the hydrated form of monazite (the mineral rhabdophane) by precipitation from an aqueous solution. The rhabdophane precipitate is then washed in two steps: the first with water and the second with a strong organic base. The water washing step removes unreacted water-soluble species and the strong base wash removes excess phosphorous both of which can degrade the thermal stability of ceramic fibers coated with monazite formulations and heated to temperatures above 2000° F.

Additional objects, advantages, and features of the present invention will become apparent from the following description and appended claims.

DETAILED DESCRIPTION OF THE PREFERRED EMBODIMENTS

The present invention provides high temperature monazite- or xenotime-based coatings that infiltrate and stiffen ceramic fabrics without causing embrittlement at temperatures at least as high as 2400° F. In one embodiment, the coatings comprise high purity monazite or xenotime powders. Monazite comprises a family of phosphates having the general formula $MPO_4$ (MP), where M is selected from the larger trivalent rare earth elements of the lanthanide series (e.g., including, but not limited to La, Ce, Nd, Pm, Sm, Eu, Gd, Tb, or combinations thereof) and coupled substituted divalents and tetravalents such as, but not limited to Ca or Sr with Th. Xenotimes are phosphates similar to monazite, where M is selected from Sc, Y, and the smaller trivalent rare earth elements of the lanthanide series (e.g., including, but not limited to Dy, Ho, Er, Tm, Yb, Lu, or combinations thereof). In a preferred embodiment, the monazite or xenotime compound is a lanthanum (La), cerium (Ce), neodymium (Nd), yttrium (Y), monazite or xenotime, or combinations thereof More preferably, the monazite powder is $LaPO_4$.

In another embodiment, the monazite powder is basically free of impurities and excess phosphorous. Preferably, the monazite powder has a stoichiometry of M:P of about 1:1. It has been found that blanket coatings comprising this high purity monazite powder produce a coating on a ceramic blanket that is stable and less susceptible to embrittlement at temperatures as high as 2400° F. Ceramic fabrics coated with monazite-based coatings that contained impurities and higher levels of excess phosphorous exhibited degradation in the retained fiber strength when exposed to similar temperatures.

In one embodiment, the monazite-based coatings comprise a high purity monazite powder and water. In another embodiment, the monazite-based coatings comprise high purity monazite powder and sub-micron inert powder. Preferably the inert powder is high purity alumina ($Al_2O_3$), zirconia, YAG, mullite, or combinations thereof. The alumina powder serves as an inert filler when the monazite powder contains M and P in the ratio 1:1, or as a getter for excess P when the monazite powder is P-rich. It is contemplated that coatings disclosed for monazite powders containing more impurities with alumina additions can also be used with the high purity monazite powders of the present invention. Non-limiting examples of such coatings are disclosed in U.S. Pat. Nos. 5,514,474 and 5,958,583, hereby incorporated by reference. In a further embodiment, the coatings also comprise SiC additives. Such additives are known to increase the coating emissivity. In yet another embodiment, the coatings of the present invention further comprise small diameter chopped fibers. Preferably, such fibers are present at an amount not greater than about 10% of the total solids volume, as a method to suppress cracking of coatings.

Methods for synthesizing high purity, monazite/xenotime powders without excess M or P are also provided by the present invention. In one embodiment the monazites or xenotimes are formed by precipitation of hydrated forms from an aqueous solution. Water-soluble lanthanide salts and either phosphate salts or phosphoric acid are dissolved in water. In a preferred embodiment, the lanthanide salt is lanthanum nitrate and phosphoric acid is the phosphate. The hydrated monazites and xenotimes formed in solution are water-insoluble and will form precipitates (e.g., rhabdophane). The precipitates are washed in flowing water to remove impurities, unreacted water-soluble species and some excess phosphate. However, some excess phosphorus may remain after water washing regardless of the amount of time spent washing. The finding that excess phosphorous is not completely removed by washing with water, and that other commercial rhabdophanes or monazite therefrom also contain excess P, was surprising and had not been noted in the prior art. To remove the remaining excess phosphorus, the precipitate is additionally washed by a strong organic base at pH equal to or greater than about 12. Preferably, the strong organic base is tetramethylammonium hydroxide. Washing with a strong organic base removes any excess phosphate and/or phosphorous, resulting in a powder with the stoichiometric ratio of M:P of about 1:1. It will be appreciated that one skilled in the art can determine the volume and/or concentrations of wash solutions necessary depending on the amount of precipitate formed to produce the monazite powders of the present invention.

In a further embodiment, the washed precipitates are first calcined to convert the rhabdophane to monazite and to coarsen them slightly and to bond the needles together. The calcined precipitate is then dispersed in water at the proper pH. Preferably the pH is from about 2 to about 4 for powder with the stoichiometric ratio of M:P of about 1:1. The pH of the water should be slightly higher. It will be appreciated that one skilled in the art can determine the proper pH for dispersion of the powder. Attrition milling, or an alternative high energy milling process, is used to de-agglomerate the particles and reduce the grain size In a preferred embodiment, the resulting powders have a particle size of about 100 nm to about 500 nm.

By way of non-limiting example, the monazite powders produced by the methods of the present invention were used to produce aqueous slurries for coating of test coupons of blanket fabrics formed from NEXTEL® 440 and NEXTEL® 610 fibers (3M, Inc.). The coatings were produced from an aqueous-based slurry (15–25 vol % solids) comprising 42.4% $LaPO_4$, 42.4% $Al_2O_3$ and 15.2% SiC. After the slurry was thoroughly mixed, $NH_4OH$ was added dropwise until the pH reached approximately 4. The slurry was then ball milled for approximately 12 hours and painted onto the blanket fabrics using a boxcoat pattern. The coated blanket fabrics were dried thoroughly prior to heat treatment. Different test specimens were heated for one hour at various temperatures, then tested to measure their retained strength and whether or not they were embrittled by the heat treatment. The retained strengths were greater than 90% of the strength of uncoated fabric subjected to an identical heat treatment coating for heat treatments at temperatures up to 2400° F. for the NEXTEL® 610 fabric and 2200° F. for the NEXTEL® 440 fabric. After heat treatment at temperatures in the range of 1800–2400° F. the coatings were hardened and more resistant to abrasion because of partial sintering of the particles within the coating. However, neither fabric was embrittled under these conditions. For comparison, coatings formed from monazite precursor solutions and alumina as disclosed in U.S. Pat. Nos. 5,514,474 and 5,958,583 with NEXTEL® 440 fabrics were embrittled and retained only 20% of their original strength after heat treatment at 2000° F.

Although the durability of the coatings of the present invention is improved by heat treatment in the temperature range 1800° F. to 2400° F., the coatings are sufficiently robust for use after drying at room temperature. Therefore, the coating could be applied to blankets already installed on a space vehicle or used for repair of a surface that is damaged in service. The same slurry produced by the methods of the present invention was used to coat complete blankets constructed with NEXTEL® 440 fabrics. After drying the coating at room temperature the blankets were tested in an arcjet facility that simulates conditions experienced by space re-entry vehicles. These tests did not cause any damage or embrittlement of the coated blankets.

Although the present invention has been described with respect to specific embodiments thereof, various changes, modifications, and substitutions may be suggested to one skilled in the art. Therefore, it is intended that the present invention encompass such changes and modifications as falling within the scope of the appended claims.

What is claimed is:

1. A method for producing a monazite or xenotime comprising:
    (a) forming a precipitate from an aqueous solution comprising a lanthanide salt and a phosphate;
    (b) washing the precipitate with water; and
    (c) washing the precipitate with an organic base with a pH greater than about 12.

2. The method of claim 1 wherein the lanthanide salt is a lanthanum salt, cerium salt, yttrium salt or combinations thereof.

3. The method of claim 1 wherein the organic base is tetramethylammonium hydroxide.

4. A monazite or xenotime produced by the method of claim 1, wherein the monazite or xenotime has a stoichiometric ratio between a metal of the monazite or xenotime and a phosphate of the monazite or xenotime of about 1:1.

5. The method of claim 1 wherein the step of washing the precipitate with the organic base further comprises washing at a temperature from about 80° C. to about 100° C.

6. A method for producing a monazite- or xenotime-based coating, comprising:
   (a) forming a precipitate from an aqueous solution comprising a lanthanide salt and a phosphate;
   (b) washing the precipitate with water;
   (c) washing the precipitate with an organic base with a pH greater than about 12;
   (d) calcining the precipitate of step (c);
   (e) milling the calcined precipitate of step (d) to form a powder; and
   (f) forming an aqueous slurry comprising the powder of step (e) and inert powder.

7. The method of claim 6 wherein the lanthanide salt is a lanthanum salt, cerium salt, yttrium salt, or combinations thereof.

8. The method of claim 6 wherein the organic base is tetramethylammonium hydroxide.

9. The method of claim 6 wherein the inert powder is alumina, zirconia, YAG, mullite, or combinations thereof.

10. The method of claim 6 wherein the aqueous slurry of step (f) further comprises an SiC additive.

11. The method of claim 6 further comprising:
   (g) applying the aqueous slurry onto a fabric of woven ceramic fibers.

12. The method of claim 6 wherein the step of washing the precipitate with the organic base further comprises washing at a temperature from about 80° C. to about 100° C.

13. A monazite- or xenotime coating composition comprising a high purity monazite or xenotime, wherein the monazite or xenotime is synthesized by forming a precipitate from an aqueous solution comprising a lanthanide salt and a phosphate, washing the precipitate with water, and washing the precipitate with an organic base with a pH of greater than about 12, the coating composition further comprising an Inert powder.

14. The coating composition of claim 13 wherein the inert powder is $Al_2O_3$, zirconia, YAG, mullite, or compositions thereof.

15. A monazite- or xenotime coating composition comprising a high purity monazite or xenotime, wherein the monazite or xenotime is synthesized by forming a precipitate from an aqueous solution comprising a lanthanide salt and a phosphate, washing the precipitate with water, and washing the precipitate with an organic base with a pH of greater than about 12, the coating composition further comprising SiC additives.

16. The coating composition of claims 13 or 15 wherein the lanthanide salt is a lanthanum salt, cerium salt, yttrium salt, or combinations thereof.

17. The coating composition of claims 13 or 15 wherein the organic base is tetramethylammonium hydroxide.

18. The coating composition of claims 13 or 15 wherein the step of washing the precipitate with the organic base further comprises washing at a temperature from about 80° C. to 100° C.

* * * * *